United States Patent
Fuentes et al.

(10) Patent No.: US 11,889,851 B2
(45) Date of Patent: Feb. 6, 2024

(54) METHOD AND COMPOSITION OF CHICKPEA FLOUR

(71) Applicant: Frito-Lay North America, Inc., Plano, TX (US)

(72) Inventors: Ximena Quintero Fuentes, Flower Mound, TX (US); Mehtap Fevzioglu, Frisco, TX (US); Antonio Garay, The Colony, TX (US)

(73) Assignee: Frito-Lay North America, Inc., Plano, TX (US)

( * ) Notice: Subject to any disclaimer, the term of this patent is extended or adjusted under 35 U.S.C. 154(b) by 107 days.

(21) Appl. No.: 17/164,130

(22) Filed: Feb. 1, 2021

(65) Prior Publication Data
US 2022/0240555 A1 Aug. 4, 2022

(51) Int. Cl.
| A23L 11/00 | (2021.01) |
| A23P 30/20 | (2016.01) |
| A23L 29/00 | (2016.01) |
| A23P 10/22 | (2016.01) |
| A23L 29/212 | (2016.01) |
| A23L 33/21 | (2016.01) |

(52) U.S. Cl.
CPC ............ *A23L 11/05* (2016.08); *A23L 29/035* (2016.08); *A23L 29/212* (2016.08); *A23L 33/21* (2016.08); *A23P 10/22* (2016.08); *A23P 30/20* (2016.08)

(58) Field of Classification Search
None
See application file for complete search history.

(56) References Cited

U.S. PATENT DOCUMENTS

| 5,296,253 | A | 3/1994 | Lusas et al. |
| 5,902,629 | A | 5/1999 | Baker et al. |
| 5,989,620 | A | 11/1999 | Wang et al. |
| 7,293,974 | B2 | 11/2007 | Bortone et al. |
| 7,820,215 | B2 | 10/2010 | Bortone et al. |
| 8,062,685 | B2 | 11/2011 | Anand et al. |
| 8,128,977 | B2 | 3/2012 | Anfinsen et al. |
| 8,574,644 | B2 | 11/2013 | Chatel et al. |
| 8,778,442 | B2 | 7/2014 | Khan et al. |
| 8,808,783 | B2 | 8/2014 | Ramirez et al. |
| 9,888,711 | B2 | 2/2018 | Morales-Alvarez et al. |
| 10,182,591 | B2 | 1/2019 | Morales et al. |
| 10,220,558 | B2 | 5/2019 | Williams et al. |
| 2008/0060532 | A1 | 3/2008 | Bortone et al. |
| 2008/0145483 | A1 | 6/2008 | Berrios et al. |
| 2011/0003047 | A1 | 1/2011 | Zakis |
| 2011/0086151 | A1 | 4/2011 | Plattner et al. |
| 2013/0202774 | A1 | 8/2013 | Barnett et al. |
| 2013/0273209 | A1 | 10/2013 | Baier et al. |
| 2016/0198754 | A1 | 7/2016 | Carder et al. |
| 2017/0273337 | A1 | 9/2017 | Brijwani et al. |
| 2020/0296975 | A1 * | 9/2020 | Lipscomb ............... A21D 6/00 |

FOREIGN PATENT DOCUMENTS

| FR | 2095758 | 11/1972 |
| GB | 1313417 | 4/1973 |
| RU | 2576448 C2 * | 3/2016 |
| WO | 2007149057 A1 | 12/2007 |
| WO | 2013003712 A1 | 1/2013 |
| WO | 2016/172570 | 10/2016 |
| WO | 2018011786 A1 | 1/2018 |
| WO | 2018133947 A1 | 7/2018 |
| WO | 2019013610 A1 | 1/2019 |

OTHER PUBLICATIONS

VegeFull™ Chickpeas—Cooked; Powder and Grits; www.adm.com/PetNutrition; ADM Animal Nutrition™, a division of Archer Daniels Midland Company (2 pages).
"Milling properties of desk and kabuli chickpea (*Cicer arietinum*) varities released in India," by Avinash Srivastava et al., Indian Journal of Agricultural Sciences, Oct. 2017 (9 pages).
Xu et al., "Changes in Odor Characteristics of Pulse Protein Isolates from Germinated Chickpea, Lentil, and Yellow Pea: Role of Lipoxygenase and Free Radicals," Food Chemistry 314 (2020) 126184, Jan. 11, 2020.
Extended Search Report issued in European Appl. No. 22154500.7 dated Jul. 12, 2022.

* cited by examiner

*Primary Examiner* — Lien T Tran
(74) *Attorney, Agent, or Firm* — Barnes & Thornburg LLP; G. Peter Nichols

(57) ABSTRACT

A composition formed from chickpea flour and having improved mouthfeel and taste, includes dextrinized starch and a controlled concentration of certain volatiles. Methods of forming the composition include extruding a composition containing chickpea at a temperature and pressure such that, when the extrudate exits the extruder, at least one volatile component is expelled.

7 Claims, 12 Drawing Sheets

METHOD AND COMPOSITION OF CHICKPEA FLOUR

The present disclosure relates generally to a chickpea flour and methods to make the chickpea flour. More specifically, the present disclosure relates to an extruded chickpea flour having an improved mouthfeel and taste.

BACKGROUND

Flour has been, and continues to be, a staple in the diet of modern humans. Due to the ever-increasing health consciousness of society and the rise of heart disease, obesity, and cholesterol, consumers are making an effort to reassess their diets and replace high caloric foods with healthier alternatives. Specifically, consumers look to incorporate foods that contain higher amounts of protein, fiber, and other nutrients. However, these products can also have undesirable mouthfeel characteristics or taste. For example, such products may be too gritty or result in a thick coating on the mouth during consumption. Additionally, the produced food products tend to have off-flavors as a result of volatile compounds present in the food product or generated during processing. As such, there is a need for a flour having increased health benefits that provides a desirable consumption experience for the consumer.

SUMMARY

In some embodiments, a chickpea flour comprises dextrinized starch; a moisture content of between 3.5% to about 10.5% by weight; and less than 0.1 ppm of Hexanal.

In one embodiment, a chickpea flour comprises at least about 95% by weight dextrinized starch; a moisture content between about 3.5% to about 10.5% by weight; less than about 0.05 ppm of c,t-3,5-Octadiene-2-one; less than about 0.02 ppm of Nonanal; between about 0.002 ppm to about 0.04 ppm of Maltol; between about 0.001 ppm to about 0.027 ppm of Furan, 2-pentyl; between about 0.01 ppm to about 0.25 ppm of Benzeneacetaldehyde; less than about 0.05 ppm of Pyrazine, 3-ethyl-2,5-dimethyl-; less than about 0.02 ppm of (E,E)-2,4-Decadienal; and between about 0.001 ppm to about 0.15 ppm of Hexanal.

In one embodiment, a method of producing a flour from chickpeas comprises extruding a chickpea composition. The chickpea composition may have an in-barrel moisture content of about 10% to 20% by weight and may be extruded at a temperature between about 250° F. to about 350° F. with a barrel pressure between about 750 to about 1050 psi to form an extruded chickpea composition. When the extruded chickpea composition exits the extruder, at least one volatile is released from the extruded chickpea composition.

In some embodiments, the chickpea composition may contain whole chickpeas while in other embodiments the chickpea composition may contain dehulled chickpeas.

In some embodiments, the chickpea flour has a moisture content ranging from about 3.75% to about 9.9% by weight.

In some aspects, dextrinized starch is present in an amount of at least about 95% by weight.

Unless otherwise specifically noted, all recited percentages refer to a percent by weight.

BRIEF DESCRIPTION OF THE DRAWINGS

The following description accompanies the drawings, all given by way of non-limiting examples that may be useful to understand how the described process and system may be embodied.

DETAILED DESCRIPTION

Figure 1:
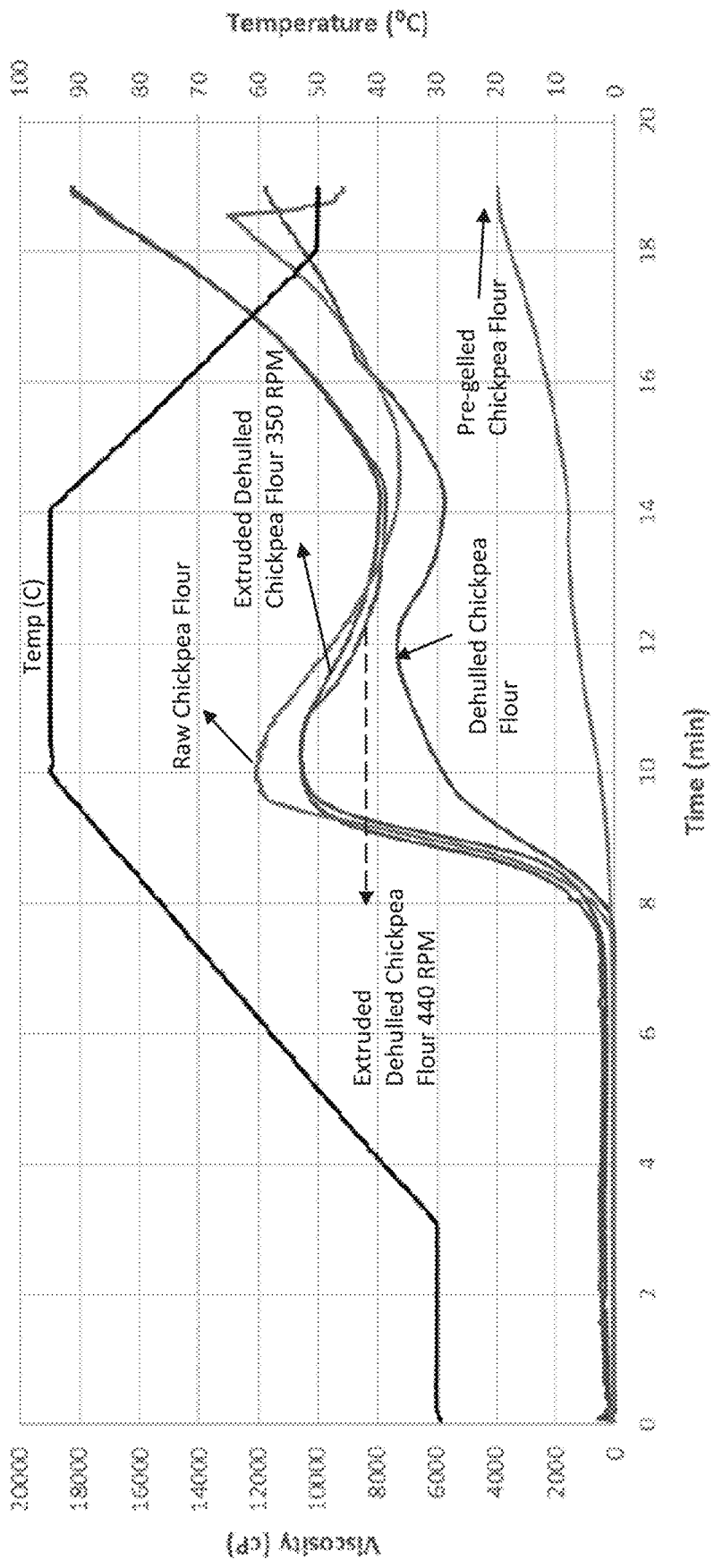
FIG. 1 is a graph of the effect of time and temperature on the viscosity of chickpea flours formed from an extruded chickpea composition when extruded with a single screw extruder.

Compositions of flour formed from chickpeas according to the following description exhibit a pleasing taste, mouthfeel, and functionality (i.e., uses in various food products). Specifically, the flour is made in a manner to control the presence and concentration of various volatiles that cause off-flavors, many of which may be formed during the processing of the chickpeas into a flour.

Methods of Making a Chickpea Flour

Methods of producing a chickpea flour may include providing a chickpea composition to an extruder and extruding the chickpea composition. In some embodiments, the extruded chickpea composition is allowed to cool producing a chickpea flour. In some embodiments, the extruded chickpea composition is subsequently milled to generate a pre-cooked chickpea flour. In the description and claims, the pre-cooked chickpea flour also refers to the chickpea flour.

In some embodiments, the method employs a chickpea composition that includes whole chickpeas or, alternatively or additionally, dehulled chickpeas.

In one embodiment, the method comprises extruding a chickpea composition with a suitable in-barrel moisture content at a temperature between about 250° F. to about 350° F. with a barrel pressure between about 750 to about 1050 psi to form an extruded chickpea composition. Advantageously, when the extruded chickpea composition exits the extruder, at least one volatile is released from the extruded chickpea composition.

In some embodiments, the chickpea composition may have an in-barrel moisture content of about 5% to about 25% by weight. In some embodiments, the in-barrel moisture content may be at least about 5%. In some embodiments, the in-barrel moisture content may be equal to or less than about 25%. In some embodiments, the in-barrel moisture content may be at least about 10%, at least about 15%, or at least about 20%.

When the chickpea composition includes whole chickpeas, the in-barrel moisture content may be between about 15% to about 18%, between about 16% to about 17%, or about 16.5%, or about 16.6%. Alternatively, when the chickpea composition comprises dehulled chickpeas, the in-barrel moisture content may be between about 8% to about 12%, or about 10% to about 11%, or about 10.5%, or about 10.7%.

In some embodiments, the chickpea composition is extruded at a temperature of at least about 200° F., and may be extruded at a temperature of up to about 350° F. In some embodiments, the chickpea composition may be extruded at a temperature between about 200° F. to about 350° F., or at a temperature of at least about 225° F., at least about 250° F., at least about 275° F., at least about 300° F., or at least about 325° F. In some embodiments, the chickpea composition is extruded at a temperature between about 225° F. to about 275° F., or between about 275° F. to about 325° F., or about 250° F., or 300° F.

In some embodiments, the in-barrel pressure may be between about 700 psi to about 1050 psi. In some embodiments, the in-barrel pressure may be at least 700 psi, or at least about 725 psi, at least about 750 psi, at least about 775 psi, at least about 800 psi, at least about 825 psi, at least about 850 psi, at least about 875 psi, at least about 900 psi, at least about 925 psi, at least about 950 psi, at least about 975 psi, at least about 1000 psi, or at least about 1025 psi. In some embodiments, the in-barrel pressure may be between about 725 psi to about 775 psi, or between about 975 psi to about 1025 psi, or about 750 psi, or about 1000 psi.

In some embodiments, the extruder may be a screw extruder or may be a twin screw extruder. An example of a commercially available twin screw extruder is a Clextral BC 45 twin-screw extruder.

Figure 3:
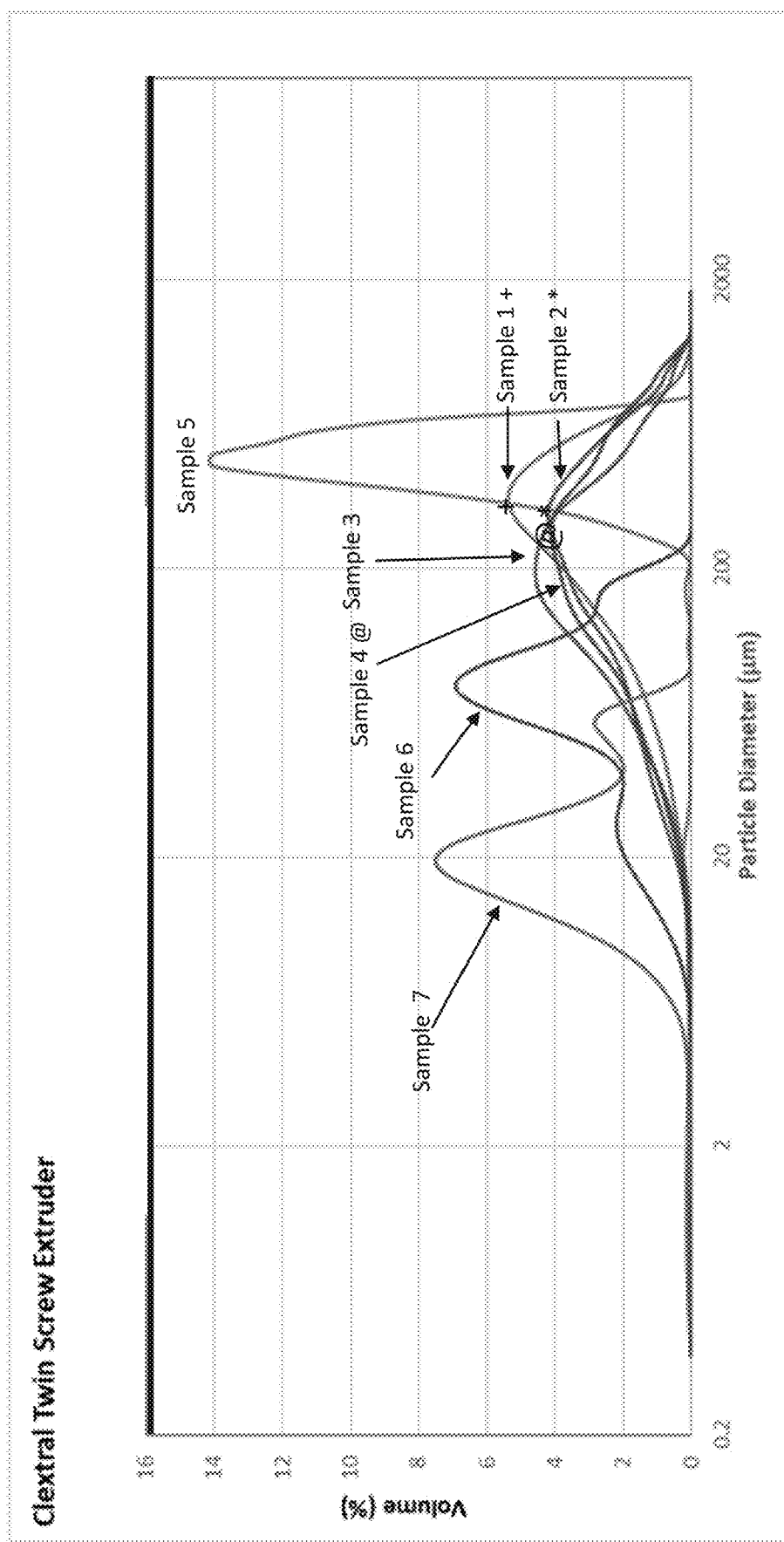
FIG. 3 is a graph of the particle diameter distribution of various chickpea flours.

The particle size of the extruded chickpea composition may be dictated, in part, on the desired mouthfeel and functionality of the flour. The term "average particle size" refers to the volume average particle size, related to the average diameter in microns (μm) of the particles. In this regard and referring to FIG. 3, in some embodiments, the average particle size of the extruded chickpea composition ranges in diameter from about 50 μm to about 1500 μm, or from about 100 μm to about 1000 μm, or about 100 μm to about 500 μm. In some embodiments, the extruded chickpea composition average particle size is at least 100 μm in diameter. In some embodiments, the extruded chickpea composition average particle size is less than 1000 μm in diameter.

In some embodiments, the method may include milling the chickpeas prior to extruding. In some embodiments, the chickpeas are milled to an average particle size in a range from about 10 μm in diameter to about 2500 μm in diameter.

In some embodiments, the extruded chickpea composition is subsequently milled to produce a pre-cooked chickpea flour. In some embodiments, the pre-cooked chickpea flour average particle size is at least about 10 μm in diameter. In some embodiments, the pre-cooked chickpea flour average particle size is less than about 1000 μm in diameter. In some embodiments, the pre-cooked chickpea flour has an average particle size of about 50 μm to about 500 μm in diameter.

Chickpea Flour

The following describes a chickpea flour having enhanced flavor and odor profiles.

In some embodiments, a chickpea flour has a moisture content of at least about 3.5% by weight and may, in some instances, have a moisture content of up to about 10.5% by weight. In some embodiments, the chickpea flour may have a moisture content of between about 3.5% to about 10%, about 3.75% to about 9.75%, about 4% to about 9.5%, about 4.25% to about 9.25%, about 4.5% to about 9.0%, about 4.75% to about 8.75%, or about 5% to about 8.5%. In some embodiments, the flour may have a moisture content of less than about 10.5%, less than about 10.0%, less than about 9.5%, less than about 9.0%, less than about 8.5%, less than about 8.0%, less than about 7.5%, less than about 7.0%, less than about 6.5%, less than about 6.0%, less than about 5.5%, or less than about 5.0%. In some embodiments, the moisture content is at least about 3.5%, at least about 3.75%, at least about 4.0%, at least about 4.25%, at least about 4.50%, at least about 5.0%, or at least about 5.5%. In other embodiments, the moisture content may be about 3.75%.

When the chickpea composition includes whole chickpeas, the moisture content of the chickpea flour may be about 7% to about 10%. When the chickpea composition includes whole chickpeas, the moisture content of the chickpea flour may be about 9.9%, or from about 9.58% to about 9.87%. In some embodiments, when the chickpea composition includes whole chickpeas, the moisture content of the chickpea flour ranges from about 7.36% to about 8.14%.

When the chickpea composition includes dehulled chickpeas, the moisture content of the chickpea flour may range from about 3.5% to about 5.5%. When the chickpea composition includes dehulled chickpeas, the moisture content of the chickpea flour may range from about 4.47% to about 5.05%. In some embodiments, when the chickpea composition includes dehulled chickpeas, the moisture content of the chickpea flour ranges from about 3.75% to about 4.48%.

In some embodiments, the flour formed from the chickpeas may have a pH of from about 5.0 to about 5.5 or from about 5.0 to about 7.0.

During processing, starch gelatinizes in the presence of excess water and heat. Under these conditions, the starch granule swells making the starch suspension viscous with the starch polymers diffusing out of the starch granule. When the moisture level is low (e.g., between about 1% to 35%) and high mechanical energy is applied, the granule undergoes shear deformation and granule disruption. Under high mechanical energy the granule disintegrates and the starch is depolymerized resulting in dextrinized starch.

In some embodiments, the chickpea flour comprises dextrinized starch. In some embodiments, the chickpea flour comprises at least about 90% by weight dextrinized starch and may include up to 100% dextrinized starch (i.e., completely dextrinized). In some embodiments, the chickpea flour comprises at least about 91%, at least about 92%, at least about 93%, at least about 94%, at least about 95%, at least about 96% at least about 97%, at least about 98%, or at least about 99% by weight dextrinized starch. In some embodiments, the chickpea flour comprises at least about 95% by weight dextrinized starch.

Viscosity of a flour may, in part, affect the functionality of the flour during processing. A more viscous flour will require more water and longer mixing times as well as different baking parameters. Characteristics of the flour affect its viscosity. For instance, the smaller the particle size will produce a flour with a higher viscosity. Alternatively, the viscosity of a flour containing greater amounts of dextrinized starch will generally be lower as compared to the viscosity of flour with gelatinized starch.

Figure 2:
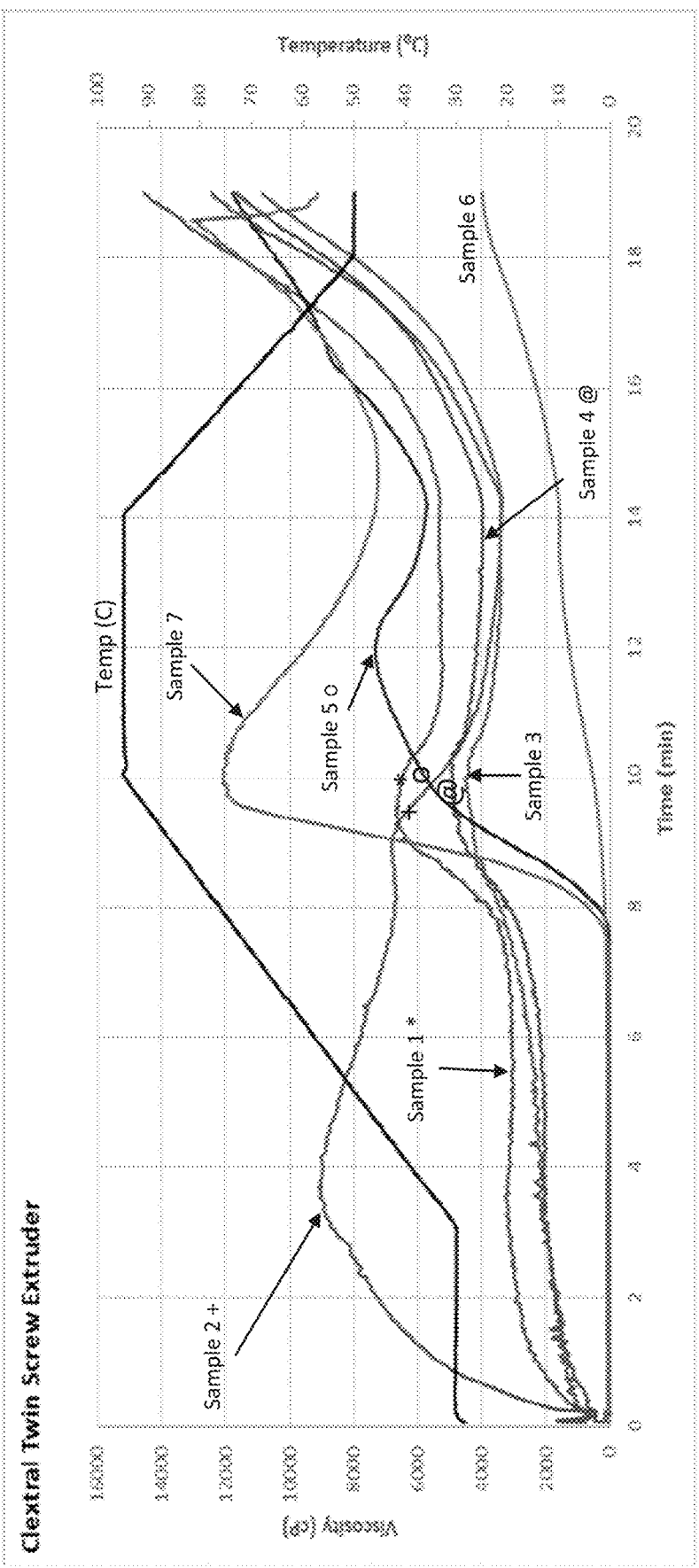
FIG. 2 is a graph of the effect of time and temperature of the viscosity of chickpea flours formed from an extruded chickpea composition when extruded with a twin screw extruder.

A Rapid Visco Analzyer (RVA) may be used to determine the viscosity of the chickpea flour compositions. The Rapid Visco Analyzer (RVA) is a rotational viscometer that is able to continuously record the viscosity of samples under controlled temperature and shear rate conditions. Referring to FIG. 1 and FIG. 2, in some embodiments, the chickpea flour has a peak viscosity of between about 3000 cP to about 8500 cP at a temperature of about 95° C. In some embodiments, the chickpea flour has a peak viscosity of about 6000 cP to about 8000 cP at a temperature of about 95° C. In some embodiments, the chickpea flour has a peak viscosity of between about 3500 cP to about 6000 cP at a temperature of about 95° C. In some embodiments, the chickpea flour has a peak viscosity of between about 4000 cP to about 5000 cP at a temperature of about 95° C.

Volatiles

The taste of flour is impacted, in part, by the concentration of volatile compounds present in the chickpea flour. Off-flavors caused by volatiles (volatile compounds) can be inherent in a pulse (e.g., chickpea) or can develop during harvesting, processing, or storage. The sources of volatiles are not completely understood, but the oxidation of lipids caused by heat or enzymatic processing is a known source. For example, one oxidation product of linolenic acid is c,t-3,5-Octadiene-2-one, which is correlated with shelf-life acceptability and a strong fatty, mushroom odor. Another, Nonanal, is an oxidation product of oleic acid. Nonanal exhibits a strong fatty odor and a fatty, citrus-like flavor. Furan,2-pentyl is formed from the oxidation of 2,4-Decadienal and is associated with green, waxy, earthy, musty, and cooked odors and taste. (E,E)-2,4-Decadienal is an oxidation product of linoleic acid and produces a powerful green odor and a fatty, oily, and green taste. Finally, Hexanal is another oxidation product of linoleic acid and results in a strong green, fatty, aldehydic odor and a green, woody, grassy taste.

In contrast, some oxidation products provide a desirable attribute to the odor and taste of the chickpea flour. For example, Maltol can be formed from heating 2,3-Dihydro-2,5-dihydroxy-6-methyl-4H-pyran-4-one (DDMP) in chickpeas or the carmalization of maltose. Maltol provides an odor and taste of sweet and caramel, respectively. Benzeneacetaldehyde is associated with a strong green and honey odor and exhibits a sweet, chocolate, honey, floral taste. Pyrazine,3-ethyle-2,5-dimethyl- is a result of the Maillard Reaction and tends to give an odor and taste of toasted notes.

Figure 4:
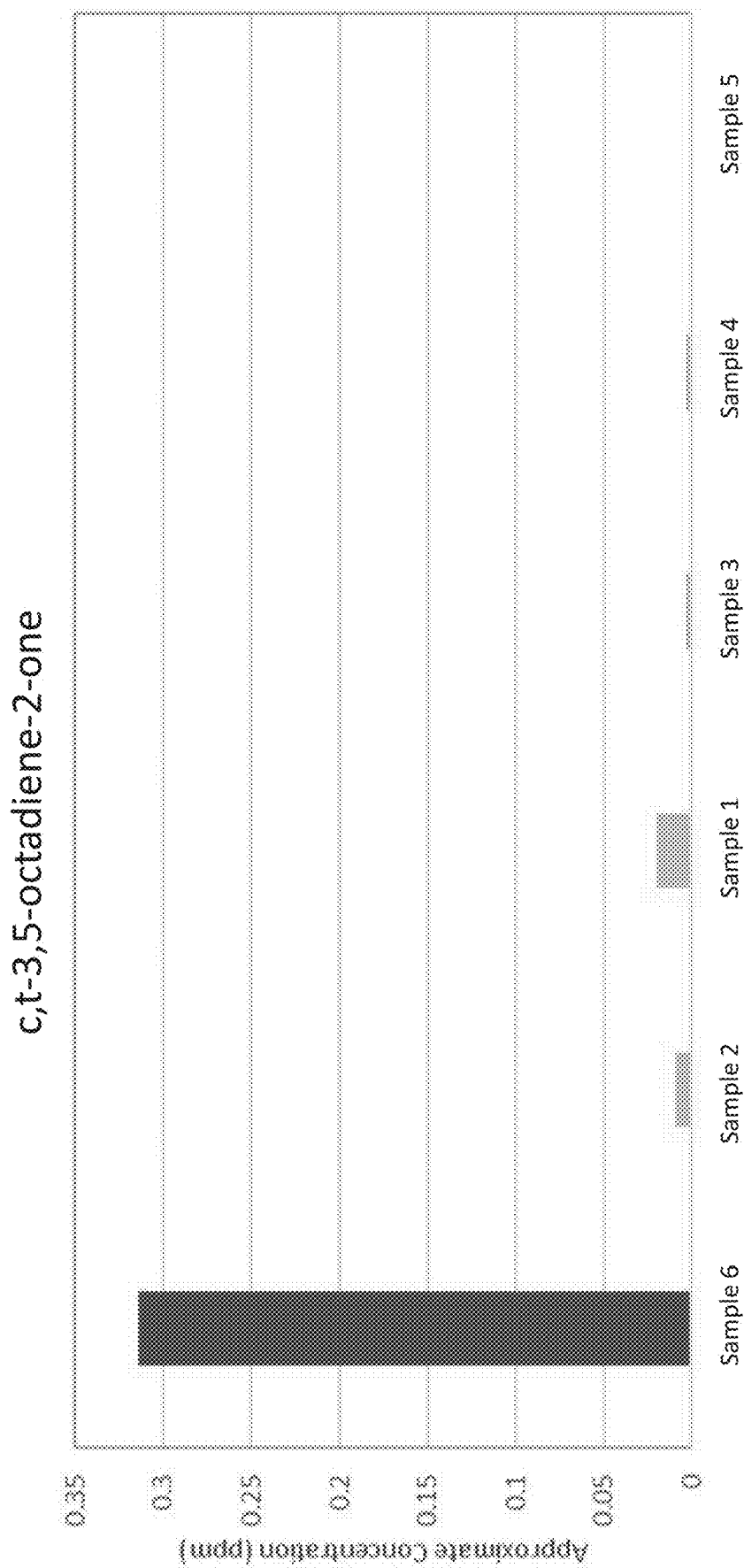
FIG. 4 is a graph of the concentration of the volatile c,t-3,5-Octadiene-2-one in various chickpea flours.

Referring to FIG. 4, in some embodiments, the volatile compound c,t-3,5-Octadiene-2-one is present in the flour. In some embodiments, c,t-3,5-Octadiene-2-one is flashed off or released during the extrusion process. In some embodiments, the concentration of the volatile c,t-3,5-Octadiene-2-one is reduced during extrusion. In some embodiments, c,t-3,5-Octadiene-2-one is present in the flour in an amount less than about 0.05 ppm. In some embodiments, the c,t-3,5-Octadiene-2-one is less than about 0.1 ppm, less than about 0.075 ppm, less than about 0.05 ppm, less than about 0.025 ppm. In some embodiments, c,t-3,5-Octadiene-2-one is present in an amount between about 0.001 ppm to about 0.03 ppm. In some embodiments, c,t-3,5-Octadiene-2-one is present in an amount of about 0.03 ppm, about 0.025 ppm, about 0.020 ppm, about 0.015 ppm, about 0.010 ppm, or about 0.005 ppm. In some embodiments, c,t-3,5-Octadiene-2-one is present in an amount between about 0.001 ppm to about 0.025 ppm. In some embodiments, c,t-3,5-Octadiene-2-one is present in an amount of about 0.001 ppm, about 0.002 ppm, about 0.003 ppm, about 0.004 ppm, about 0.005 ppm. In some embodiments, c,t-3,5-Octadiene-2-one is present in an amount of about 0.010 ppm. In some embodiments, c,t-3,5-Octadiene-2-one is present in an amount of about 0.015 ppm. In some embodiments, c,t-3,5-Octadiene-2-one is present in an amount of about 0.020 ppm. In some embodiments, c,t-3,5-Octadiene-2-one is present in an amount of about 0.025 ppm.

Figure 5:
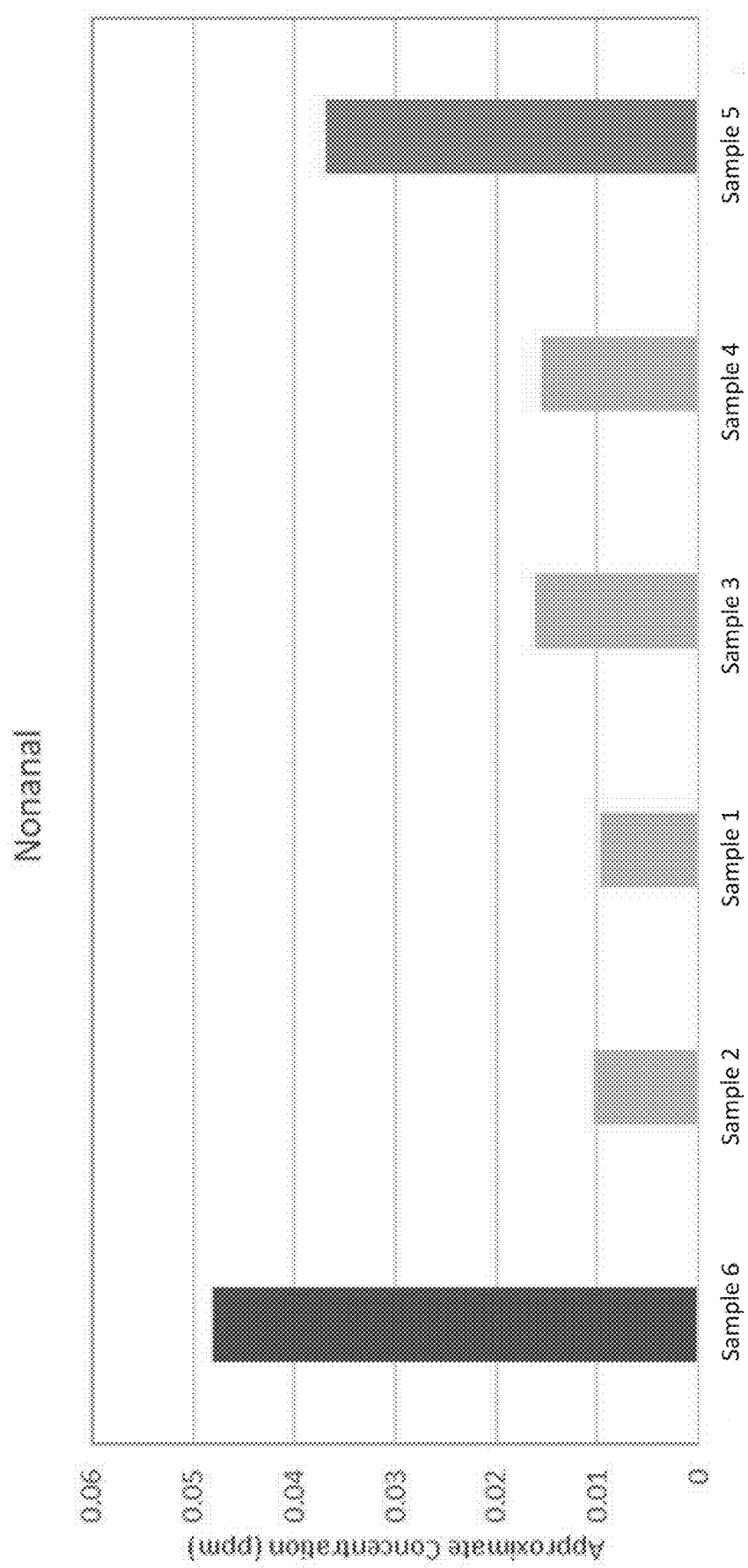
FIG. 5 is a graph of the concentration of the volatile Nonanal of the chickpea flours.
Figure 6:
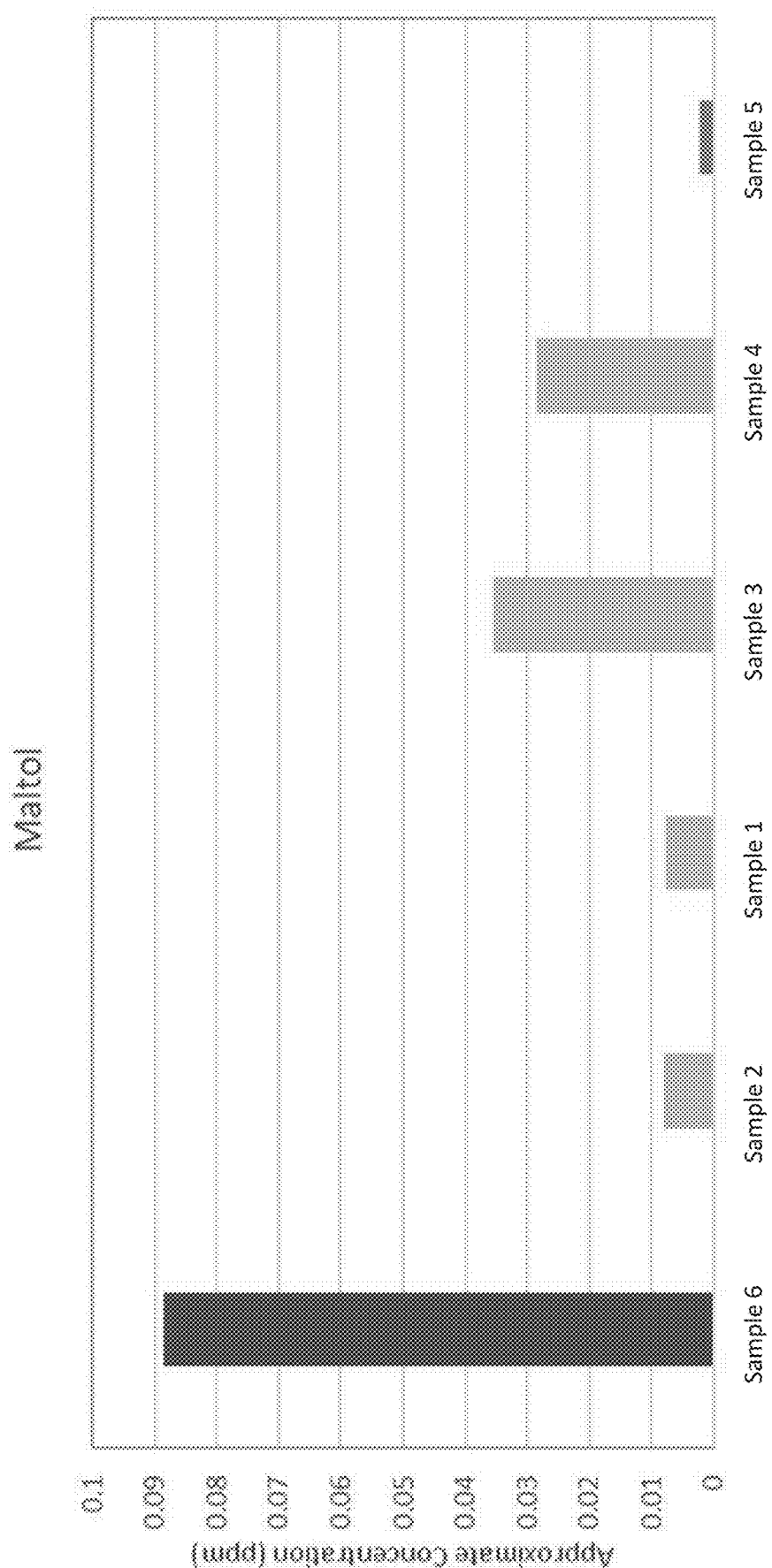
FIG. 6 is a graph of the concentration of the volatile Maltol in various chickpea flours.
Figure 7:
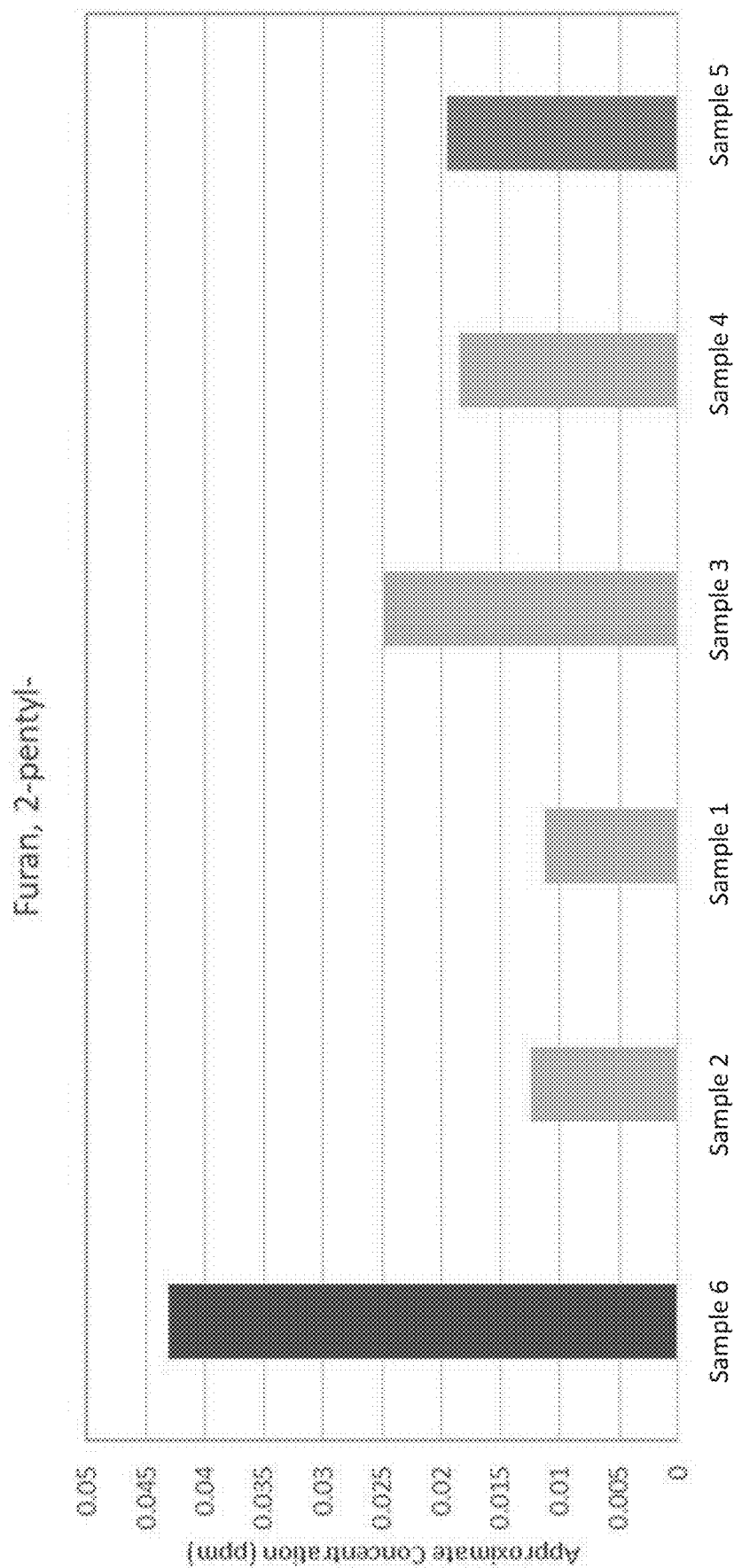
FIG. 7 is a graph of the concentration of the volatile Furan, 2-pentyl in various chickpea flours.

Referring to FIG. 5, in some embodiments, the volatile Nonanal is present in the flour. In some embodiments, Nonanal is flashed off or released during extrusion. In some embodiments, Nonanal is reduced during extrusion. In some embodiments, Nonanal is present in an amount of less than about 0.02 ppm. In some embodiments, Nonanal is present in an amount of less than about 0.015 ppm. In some embodiments, Nonanal is present in an amount of less than about 0.010 ppm. In some embodiments, Nonanal is present in an amount between about 0.005 ppm to about 0.016 ppm. In some embodiments, wherein the chickpea flour comprises whole chickpeas, Nonanal is present in an amount between about 0.009 ppm to about 0.011 ppm. In some embodiments, wherein the chickpea flour comprises dehulled chickpeas, Nonanal is present in an amount between about 0.014 ppm to about 0.017 ppm. In some embodiments, Nonanal is present in an amount of about 0.015 ppm. In some embodiments, Nonanal is present in an amount of about 0.010 ppm. In some embodiments, Referring to FIG. 6, in some embodiments, the volatile Maltol is present in the flour. In some embodiments, Maltol is flashed off or released during extrusion. In some embodiments, Maltol is reduced during extrusion. In some embodiments, Maltol is present in an amount of less than about 0.04 ppm. In some embodiments, Maltol is present in an amount greater than about 0.008 ppm. In some embodiments, Maltol is present in an amount between about 0.002 ppm to about 0.04 ppm. In some embodiments, Maltol is between present in an amount of about 0.008 ppm to about 0.036 ppm. In some embodiments, wherein the chickpea flour comprises dehulled chickpeas, Maltol is present in an amount between about 0.039 ppm to about 0.028 ppm. In some embodiments, wherein the chickpea flour comprises whole chickpeas, Maltol is present in an amount between 0.007 ppm to about 0.0099 ppm Referring to FIG. 7, in some embodiments, the volatile Furan, 2-pentyl- is present in the flour. In some embodiments, Furan, 2-pentyl- is flashed off or released during extrusion. In some embodiments, Furan, 2-pentyl- is reduced during extrusion. In some embodiments, Furan, 2-pentyl- is present in an amount of less than about 0.025 ppm. In some embodiments, Furan, 2-pentyl- is present in an amount of more than about 0.01 ppm. In some embodiments, Furan, 2-pentyl- is present in an amount of between about 0.01 ppm to about 0.025 ppm. In some embodiments, wherein the chickpea flour comprises whole chickpeas, Furan, 2-pentyl- is present in an amount of between about 0.01 ppm to about 0.013 ppm. In some embodiments, wherein the chickpea flour comprises dehulled chickpeas, Furan, 2-pentyl- is present in an amount of between about 0.016 ppm to about 0.026 ppm. In some embodiments, Furan, 2-pentyl- is present in the chickpea flour in an amount of about 0.011 ppm, about 0.013 ppm, about 0.017 ppm, or about 0.025 ppm.

Figure 8:
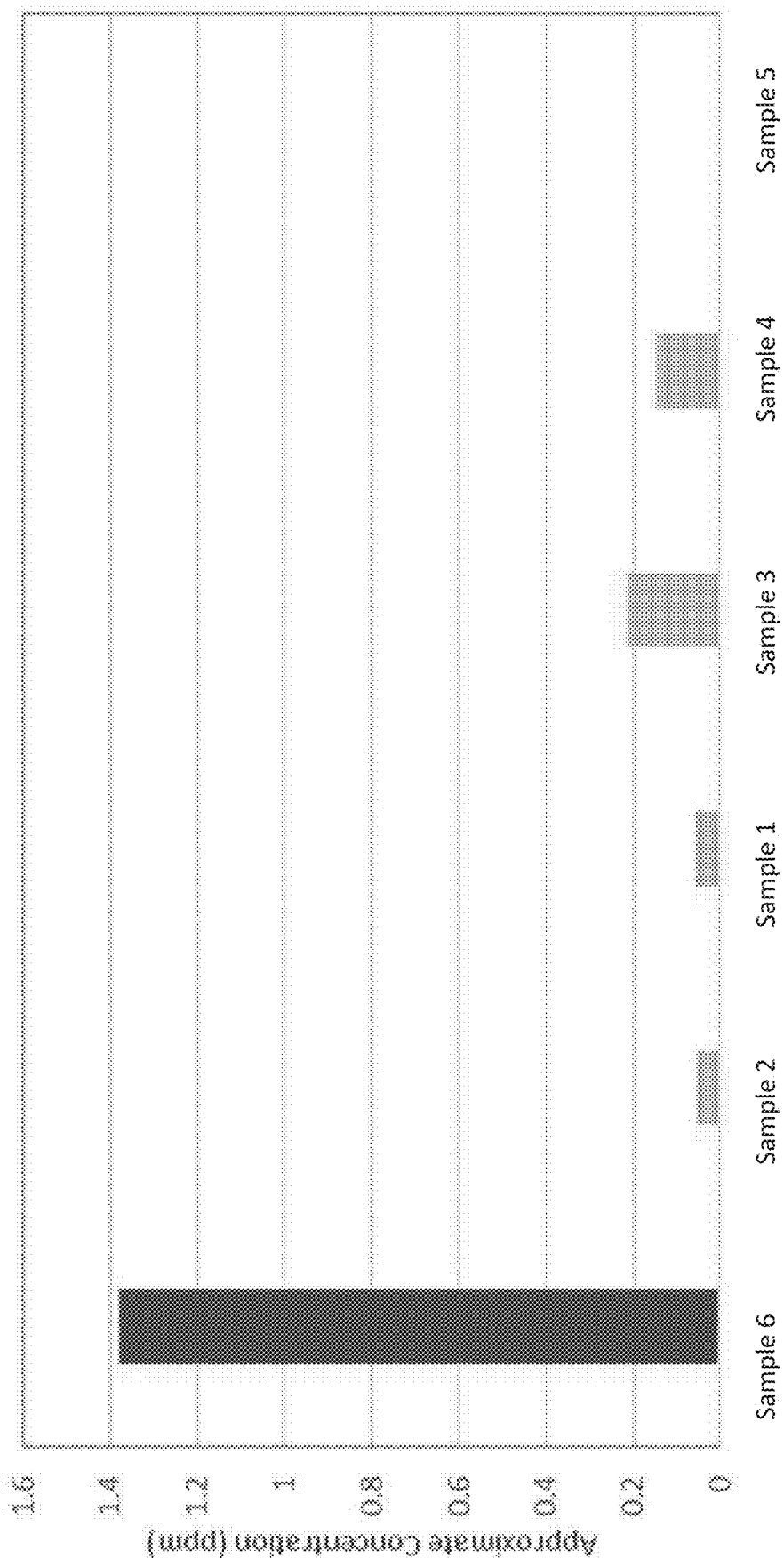
FIG. 8 is a graph of the concentration of the volatile Benzeneacetaldehyde in various chickpea flours.

Referring to FIG. 8, in some embodiments, the volatile Benzeneacetaldehyde is present in the flour. In some embodiments, Benzeneacetaldehyde is flashed off or released during extrusion. In some embodiments, the flour has a reduced amount of Benzeneacetaldehyde. In some embodiments, Benzeneacetaldehyde is present in an amount of less than about 0.21 ppm. In some embodiments, Benzeneacetaldehyde is present in an amount of less than about 0.18 ppm. In some embodiments, Benzeneacetaldehyde is present in an amount of less than about 0.10 ppm. In some embodiments, Benzeneacetaldehyde is present in an amount of less than about 0.05 ppm. In some embodiments, Benzeneacetaldehyde is between about 0.025 ppm to about 0.21 ppm. In some embodiments, wherein the chickpea flour comprises whole chickpeas, Benzeneacetaldehyde is present in an amount of between about 0.010 ppm to about 0.050 ppm. In some embodiments, wherein the chickpea flour comprises dehulled chickpeas, Benzeneacetaldehyde is present in an amount of between about 0.10 ppm to about 0.22 ppm. In some embodiments, Benzeneacetaldehyde is present in the chickpea flour in an amount of about 0.025 ppm, about 0.050 ppm, about 0.10 ppm, about 0.15 ppm, about 0.20 ppm, or about 0.25 ppm.

Figure 9:
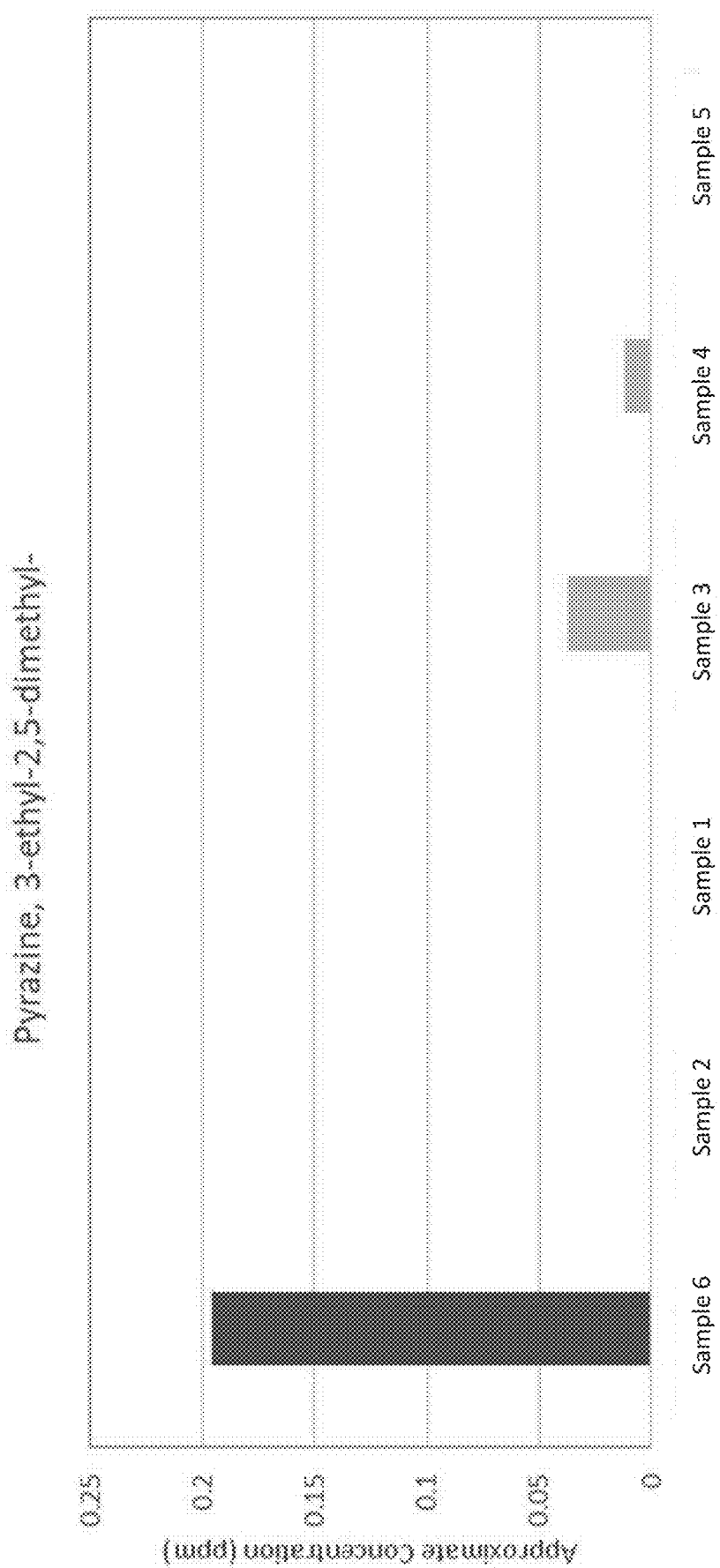
FIG. 9 is a graph of the concentration of the volatile Pyrazine, 3-ethyl-2,5-dimethyl- in various chickpea flours.

Referring to FIG. 9, in some embodiments, the volatile Pyrazine, 3-ethyl-2,5-dimethyl- is present in the flour. In some embodiments, Pyrazine, 3-ethyl-2,5-dimethyl- is flashed off or released during extrusion. In some embodiments, Pyrazine, 3-ethyl-2,5-dimethyl- is present in an amount of less than about 0.05 ppm. In some embodiments, Pyrazine, 3-ethyl-2,5-dimethyl- is present in an amount of less than about 0.04 ppm. In some embodiments, Pyrazine, 3-ethyl-2,5-dimethyl- is not present. In some embodiments, wherein the chickpea flour comprises dehulled chickpeas, Pyrazine, 3-ethyl-2,5-dimethyl- is present in an amount of between about 0.001 ppm to about 0.045 ppm. In some embodiments, Pyrazine, 3-ethyl-2,5-dimethyl- is present in the chickpea flour in an amount of about 0.045 ppm, about 0.040 ppm, about 0.030 ppm, about 0.020 ppm, about 0.010 ppm, or absent.

Figure 10:
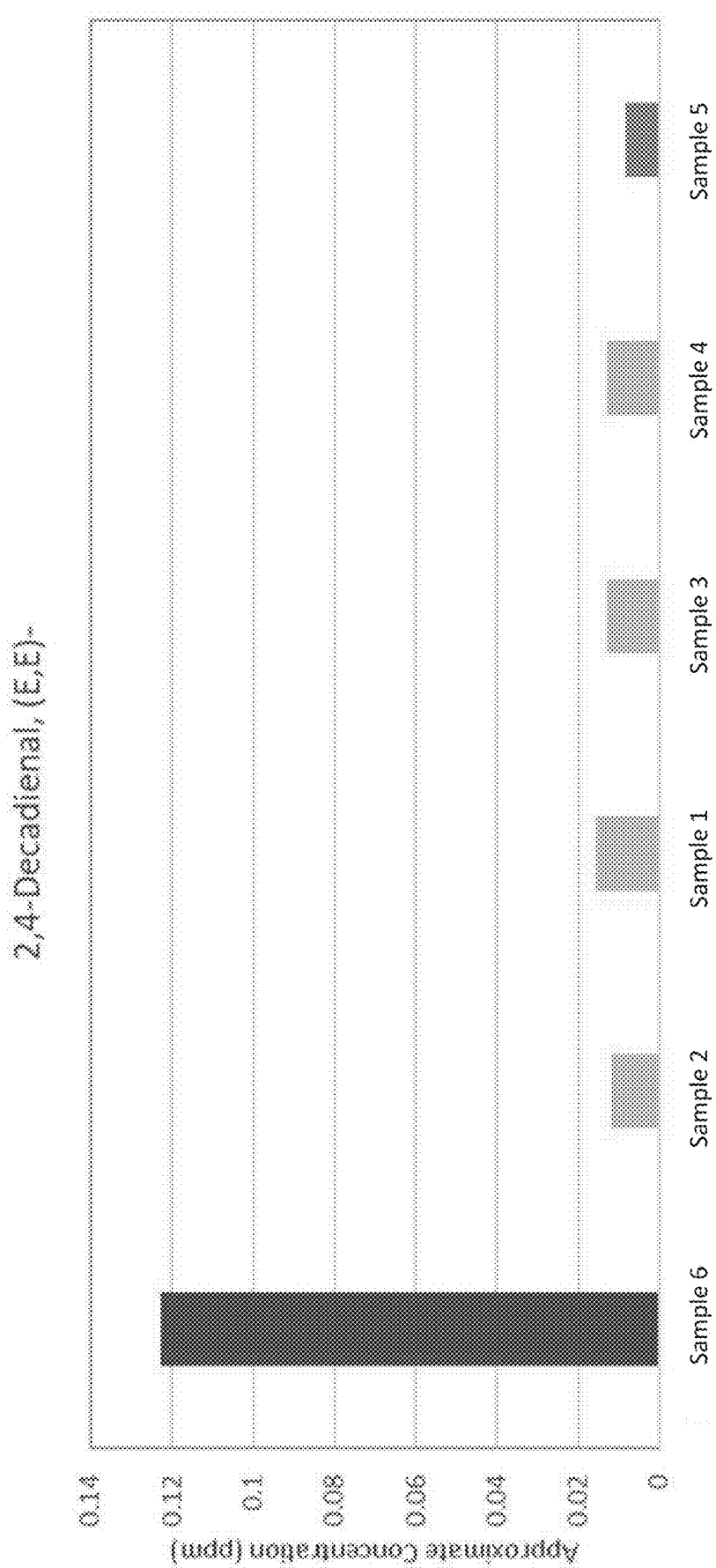
FIG. 10 is a graph of the concentration of the volatile (E,E)-2,4-Decadienal in various chickpea flours.

Referring to FIG. 10, in some embodiments, the volatile (E,E)-2,4-Decadienal is present in the flour. In some embodiments, (E,E)-2,4-Decadienal is flashed off or released during extrusion. In some embodiments, (E,E)-2,4-Decadienal is provided in a reduced amount. In some embodiments, (E,E)-2,4-Decadienal is present in an amount of at least about 0.01 ppm. In some embodiments, (E,E)-2,4-Decadienal is present in an amount of less than about 0.02 ppm. In some embodiments, (E,E)-2,4-Decadienal is present in an amount of between about 0.005 ppm to about 0.018 ppm. In some embodiments, (E,E)-2,4-Decadienal is present in an amount of about 0.005 ppm, about 0.0075 ppm, about 0.010 ppm, about 0.0125 ppm, about 0.0150 ppm, about 0.0175 ppm, or about 0.0190 ppm.

Figure 11:
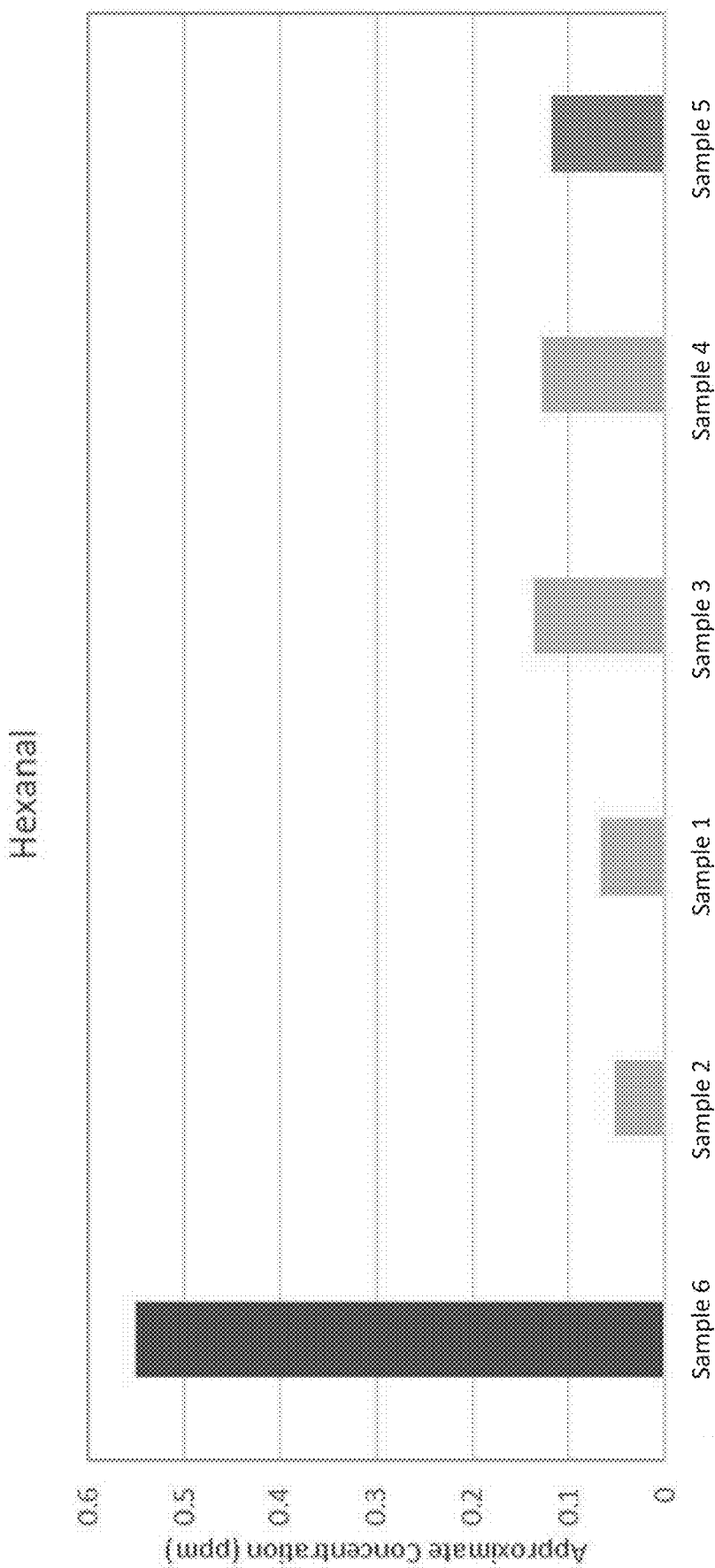
FIG. 11 is a graph of the concentration of the volatile Hexanal in various chickpea flours.

Referring to FIG. 11, in some embodiments, the volatile Hexanal is present in the flour. In some embodiments, Hexanal is flashed off or released during extrusion. In some embodiments, the amount of Hexanal in the flour is reduced. In some embodiments, Hexanal is present in an amount of at least about 0.025 ppm. In some embodiments, Hexanal is present in an amount of at least about 0.05 ppm. In some embodiments, Hexanal is present in an amount of less than about 0.15 ppm. In some embodiments, Hexanal is present in an amount of about 0.030 ppm to about 0.155 ppm. In some embodiments, Hexanal is present in an amount of about 0.030 ppm to about 0.06 ppm. In some embodiments, Hexanal is present in an amount of about 0.10 ppm to about 0.15 ppm. In some embodiments, Hexanal is present in an amount of about 0.05 ppm, about 0.07 ppm, about 0.11 ppm, or about 0.15 ppm.

In some embodiments, a chickpea flour comprises at least about 95% dextrinized starch, a moisture content of between about 3.5% to about 10.5%, less than about 0.05 ppm of c,t-3,5-Octadiene-2-one, less than about 0.02 ppm of Nonanal, between about 0.002 ppm to about 0.04 ppm of Maltol, between about 0.001 ppm to about 0.027 ppm of Furan, 2-pentyl, between about 0.01 ppm to about 0.25 ppm of Benzeneacetaldehyde, less than about 0.05 ppm of Pyrazine, 3-ethyl-2,5-dimethyl-, less than about 0.02 ppm of (E,E)-2,4-Decadienal, and between about 0.001 ppm to about 0.15 ppm of Hexanal.

In some embodiments, the chickpea flour includes dextrinized starch, a moisture content of less than about 10.5%, and Hexanal present in an amount of less than about 0.1 ppm.

In one aspect, a method of producing a flour from chickpeas, the method comprising extruding a chickpea composition having an in-barrel moisture content of about 10% to 20% by weight at a temperature between about 250° F. to about 350° F. with a barrel pressure between about 750 to about 1050 psi to form an extruded chickpea composition, wherein when the extruded chickpea composition exits the extruder, at least one volatile is released from the extruded chickpea composition. In some embodiments, the at least one volatile is selected from c,t-3,5-octadien-2-one, Furan, 2-pentyl-, Benzeneacetaldehyde, Pyrazine, 3-ethyl-2,5-dimethyl-, Nonanal, Maltol, (E,E)-2,4-Decadienal, or Hexanal.

In some embodiments, the at least one volatile released is selected from c,t-3,5-octadien-2-one, Furan, 2-pentyl-, Benzeneacetaldehyde, Pyrazine, 3-ethyl-2,5-dimethyl-, or (E,E)-2,4-Decadienal.

Examples and Methodology

Six flour samples were tested in the following experiments. Additionally, raw chickpeas were also tested to compare with six flours, which generates a total of seven samples. The seven samples are provided below in Table 1.

TABLE 1 identifying the seven samples.

| Sample # | Name |
| --- | --- |
| 1 | Whole chickpea, milled, 300 RPM (also denoted as "cell 1") |
| 2 | Whole chickpea, milled, 250 RPM (also denoted as "cell 2") |
| 3 | Dehulled chickpea flour, 250 PRM (also denoted as "cell 3") |
| 4 | Dehulled chickpea flour, 300 RPM (also denoted as "cell 4") |
| 5 | Dehulled chickpea flour, no processing-commercially purchased |
| 6 | Pre-gelled chickpea flour, no processing-commercially purchased |
| 7 | Raw chickpea flour, no processing. |

Three control samples, Sample 5, 6, and 7, were compared to the chickpea flour according to the described composition and made according to the described method. Sample 6 is a chickpea flour that is commercially available from ADM and is processed in a manner that results in the flour having gelled starch prior to cooking (also referred to as "pre-gelled"). Sample 5 is a commercially available pulse 4135 Flour sold by INGREDION under the tradename HOMECRAFT and it contains a composition of milled, dehulled chickpeas. Information on the composition's characteristics are provided by the company on information sheet "HOMECRAFT Pulse 4135 Flour 37204H00."

As shown in more detail in Table 2, four compositions were produced based on different processes. The first experimental flour (referred to as "cell 1") was generated using whole chickpea that was hammer milled and collected using a screen size of 1531-0109 (Round, 0.109"/2.8 mm) and then extruded at 300 RPM, with an in-barrel moisture content of 16.6%, and a barrel pressure of 750 psi. The second experimental flour (referred to as "cell 2") was generated using whole chickpea that was hammer milled and collected using a screen size of 1531-0109 (Round, 0.109"/2.8 mm) and then extruded at 250 RPM with an in-barrel moisture content of 16.6%, and a barrel pressure of 900 psi. The third experimental flour (referred to as "cell 3") was generated using dehulled chickpea flour that was extruded at 250 RPM with an in-barrel moisture content of 10.7% and a barrel pressure of 1000 psi. The fourth experimental flour (referred to as "cell 4") was generated from dehulled chickpea flour extruded at 300 RPM with an in-barrel moisture content of 10.7%, and a barrel pressure of 1000 psi. Further information on each of the process and product conditions are provided in Table 2.

TABLE 2

Process and Conditions for generating a chickpea flour

| | Sample/Cell | | | |
|---|---|---|---|---|
| | 1 Whole Chickpea Flour | 2 Whole Chickpea Flour | 3 Dehulled Chickpea Flour | 4 Dehulled Chickpea Flour |
| Dry Mix Moisture | 12.26 | 12.26 | 5.30 | 5.30 |
| Meal feeder, lb/h | 250 | 250 | 250 | 250 |
| Water pump setpoint, lb/h | 13.00 | 13.00 | 15.00 | 15.00 |
| Oil pump, lb/hr | | | | |
| RPM | 300 | 250 | 250 | 300 |
| InBrl, H20, % (calculated) | 16.6% | 16.6% | 10.7% | 10.7% |
| kW | 10.7 | 10.8 | 14.3 | 17 |
| SME (wh/kg) | 89.7 | 91.6 | 119.0 | 141.4 |
| AMPS | 24.9 | 31.8 | 38.1 | 37 |
| Die Plate Temp a/b, deg F. | 255 | 255 | 255 | 255 |
| T 1 Act. (F.) | 100 | 100 | 100 | 100 |
| T 2 Act. (F.) | 99 | 99 | 100 | 99 |
| T 3 Act. (F.) | 150 | 151 | 153 | 145 |
| T 4 Act. (F.) | 199 | 250 | 251 | 200 |
| T 5 Act. (F.) | 250 | 302 | 300 | 250 |
| Thrust (Gbox psi) | 1122 | 1318 | 1371 | 1383 |
| Barrel Pressure (psi) | 750 | 900 | 1000 | 1000 |
| extrudate temp in CFDP (F) | 298 | 317 | 343 | 341 |
| cutter RPM | 40 | 40 | 29 | 29 |
| blade count-face cutter | 1 | 1 | 1 | 1 |
| Moisture (milled flour) | 9.58-9.87 | 7.36-8.14 | 4.47-5.05 | 3.75-4.48 |

Four of the samples, Samples/Cell 1, 2, 3, 4 were processed by heating and extruding the chickpea compositions. In some embodiments, a single screw extruder was used while in other embodiments a twin screw extruder was used. As shown in FIG. 1 and FIG. 2, the viscosity of the flour changed based on the type of extruder used. The processing parameters shown in Table 2 used a twin screw extruder.

In some embodiments, the chickpea composition was milled prior to the step of extruding. A range of average particle sizes were tested from about 10 μm in diameter to about 2500 μm. Various screen sizes were used to select and control for the particle size of the chickpea compositions. For example, one of the screens used had a screen size of 1531-0109 (Round, 0.109"/2.8 mm). In some embodiments, the extruded chickpea composition is subsequently milled. Various screen sizes may be selected based on the desired particle size. For example, one of the screens used had a screen size of 1532-0040 (Round, 0.040"/1.0 mm).

Particle Size was analyzed and identified using methods known in the art. For instance, a Beckman Coulter Particle Size Analyzer (PSA) with Dry Powder System (DPS) was used to analyze the particle sizes of the samples.

Figure 12:
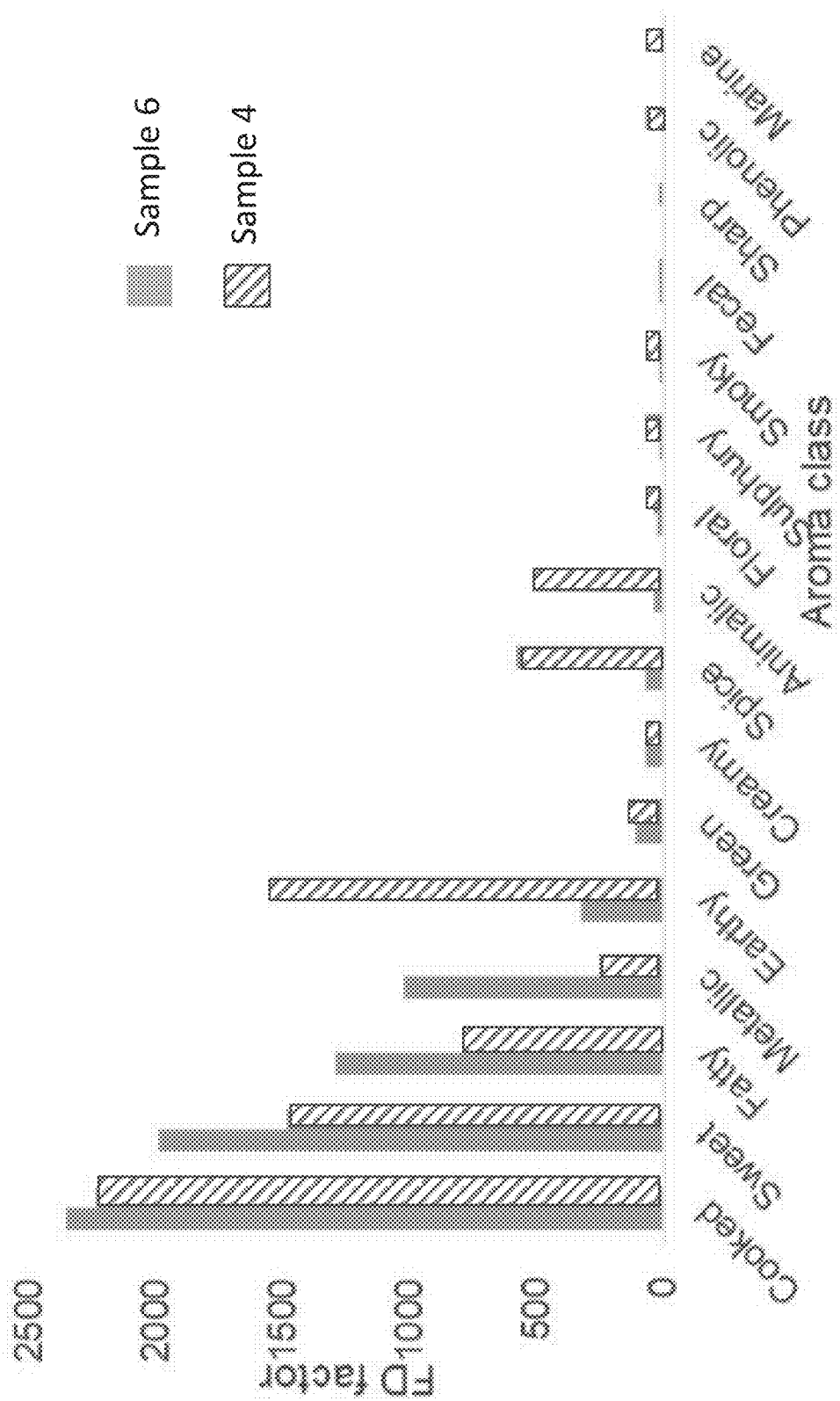
FIG. 12 is a graph showing the flavor dilution (FD) factor score of a control chickpea flour compared to a chickpea flour according to the described method and composition.

An aroma analysis was performed on the dehulled extruded flour, Sample 4, and the pre-gelled flour, Sample 6. To identify the odors in the samples, a Gas Chromatography Olfactometry (GC-O) analysis was performed. The GC-O provides a flavor dilution (FD) factor score—the higher the FD value the more potent the compound's odor. As shown in FIG. 12, the extruded flour had a decrease of fatty and metallic aroma compared to the control flour illustrating that certain volatiles have been flashed off. Table 3 provides the FD-factor score for each sample.

TABLE 3

Comparison of Aroma Analysis Data Between Sample 6 and Sample 4.

| Compound | Odor quality | FD-factor |
|---|---|---|
| Pre-gelled Flour Finish | | |
| trans-4,5-epoxy-(E)-2-decenal | metallic | 1024 |
| methional | boiled potato | 1024 |
| (E,E)-2,4-decadienal | fatty | 1024 |
| 2-acetyl-1-pyrroline | roasty | 1024 |
| phenylacetaldehyde | honey | 1024 |
| furaneol | caramel | 512 |
| (E,E)-2,4-nonadienal | fatty | 256 |
| p-anisealdehyde | anise | 256 |
| vanillin | vanilla | 128 |
| 2-ethyl-3,5-dimethylpyrazine | earthy | 128 |
| Sample 4 Flour Finish | | |
| methional | boiled potato | 1024 |
| 2,3-diethyl-5-methylpyrazine | earthy | 1024 |
| furaneol | caramel | 1024 |
| 2-acetyl-1-pyrroline | roasty | 512 |
| (E,E)-2,4-decadienal | fatty | 512 |
| sotolone | seasoning | 512 |
| 2-aminoacetophenone | foxy | 512 |
| 2-/3-methylbutanal | malty | 256 |
| 6-acteyl-2,3,4,5-tetrahydropyridine | roasty | 256 |
| trans-4,5-epoxy-(E)-2-decenal | metallic | 256 |

The samples were analyzed to determine concentrations of volatiles comparing the four samples (i.e., samples 1, 2, 3, and 4) to the pre-gelled flour and the unprocessed milled dehulled chickpea flour (i.e., samples 6 and 5, respectively). As shown in FIGS. 4-11, the chickpea compositions were processed in a manner to remove or reduce off-flavor-producing volatiles and to retain desirable odors and tastes. The amount of volatiles present in the flours was determined using gas chromatography and mass spectrometry. Volatile analysis was performed on the chickpea flour samples after each was extruded under the conditions provided in Table 2 and subsequently milled. For volatile characterization the samples were kept refrigerated and volatiles were extracted using a stepwise process.

Each sample was analyzed using a head space SPME GC/MS technique. Approximately 1 gram of sample was analyzed in duplicate using a 65 μm PDMS/DVB SPME fiber at 60° C. extraction and subsequently injected into an Agilent 7890A and 5977A GC/MS system and was analyzed using a 30 m DB-5 column. Additionally, the data was processed using semi quantitation results that were reported in ppm using two levels of a calibration curve of 3-ethyl-2,5-dimethyl pyrazine. The flavor trends and oxidation levels were used to provide insights related to the samples.

As a result of the described processing methods that results in an extruded chickpea flour comprising dextrinized starch and a unique volatile profile, the viscosity profiles of samples 1, 2, 3, and 4 differ as compared to the pre-gelled starch flour, unprocessed dehulled chickpea flour, and raw chickpea (i.e., samples 6, 5, and 7), as shown in FIG. 1 and FIG. 2. The process of measuring the viscosity of a substance is well known in the art. Briefly, a rapid visco analyzer (RVA) was used to test each sample. The control samples (i.e., Samples 5, 6, and 7) were analyzed without any processing, the four flour samples were tested after extrusion. The moisture content of each sample measured with Mettler Toledo HR83 moisture balance. Next, a slurry containing 20% solids was created by combining the sample (corrected for moisture content) and DI water to produce a total slurry weight of about 28 g. The slurry was placed in the RVA and the slurry was exposed to temperature points ("profile") of 30° C. to 95° C. to 50° C. while being stirred. The analysis was performed for about 18 minutes.

While the concepts of the present disclosure are susceptible to various modifications and alternative forms, specific exemplary embodiments of the disclosure have been shown by way of example in the drawings. It should be understood, however, that there is no intent to limit the concepts of the present disclosure to the particular disclosed forms; the intention is to cover all modifications, equivalents, and alternatives falling within the spirit and scope of the invention as defined by the claims. Although this disclosure refers to specific embodiments, it will be understood by those skilled in the art that various changes in form and detail may be made without departing from the subject matter set forth in the accompanying claims.

The invention claimed is:

1. A method of producing a chickpea flour with an enhanced flavor comprising:
    providing a chickpea composition that consists of whole chickpeas or dehulled chickpeas to an extruder;
    extruding the chickpea composition having an in-barrel moisture content of about 8% to about 17% by weight at a temperature between about 250° F. to about 350° F. under high mechanical energy and a barrel pressure between about 750 to about 1050 psi to form an extruded chickpea composition with at least about 90% by weight dextrinized starch, wherein when the extruded chickpea composition exits the extruder, at least one volatile is released from the extruded chickpea composition; and
    milling the extruded chickpea composition to form the chickpea flour with an average particle size of about 50 μm to about 500 μm in diameter.

2. The method of claim 1, wherein the chickpea composition consists of whole chickpeas.

3. The method of claim 1, wherein the chickpea composition consists of dehulled chickpeas.

4. The method of claim 1, wherein the at least one volatile is selected from c,t-3,5-octadien-2-one, Furan, 2-pentyl-, Benzeneacetaldehyde, Pyrazine, 3-ethyl-2,5-dimethyl-, or (E,E)-2,4-Decadienal.

5. The method of claim 1, wherein at least 95% of starch in the extruded chickpea composition is dextrinized.

6. The method of claim 2 further comprising milling the chickpea composition prior to providing the chickpea composition to the extruder.

7. The method of claim 1, wherein the chickpea flour has a moisture content of about 3.5% to about 5.5%.

* * * * *